(12) United States Patent
Stringfellow

(10) Patent No.: US 6,997,166 B2
(45) Date of Patent: Feb. 14, 2006

(54) FUEL INJECTOR

(75) Inventor: Christopher Stringfellow, Stroud (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/009,453

(22) Filed: Dec. 10, 2004

(65) Prior Publication Data

US 2005/0133629 A1    Jun. 23, 2005

(30) Foreign Application Priority Data

Dec. 12, 2003  (EP) ................................ 03257834

(51) Int. Cl.
*F02M 37/04* (2006.01)
(52) U.S. Cl. ..................... 123/467; 123/456
(58) Field of Classification Search ................ 123/467, 123/514, 446, 500, 501, 458
See application file for complete search history.

(56) References Cited

U.S. PATENT DOCUMENTS

| | | | | |
|---|---|---|---|---|
| 5,458,103 A | * | 10/1995 | Lauvin ........................ | 123/456 |
| 5,913,300 A | * | 6/1999 | Drummond .................. | 123/467 |
| 6,253,736 B1 | * | 7/2001 | Crofts et al. ................. | 123/498 |
| 6,367,453 B1 | * | 4/2002 | Igashira et al. .............. | 123/467 |
| 6,553,967 B1 | * | 4/2003 | Mahr .......................... | 123/467 |
| 6,575,139 B1 | * | 6/2003 | Rodriguez-Amaya et al. ... | 123/467 |
| 6,763,809 B1 | * | 7/2004 | Grabandt .................... | 123/467 |
| 2001/0003976 A1 | * | 6/2001 | Lehtonen .................... | 123/467 |
| 2003/0098015 A1 | | 5/2003 | Potschin | |
| 2003/0155437 A1 | | 8/2003 | Lei | |

FOREIGN PATENT DOCUMENTS

| | | |
|---|---|---|
| DE | 10131619 | 1/2003 |
| EP | 1236885 | 4/2002 |

* cited by examiner

Primary Examiner—Carl S. Miller
(74) Attorney, Agent, or Firm—David P. Wood (57) ABSTRACT

A fuel injector for use in an internal combustion engine, comprising a supply passage for high pressure fuel and an injection nozzle for receiving high pressure fuel. The injection nozzle includes a valve needle which is engageable with a valve needle seating to control fuel delivery from the injector. A surface associated with the valve needle is exposed to fuel pressure within a control chamber and a first restricted flow path provides communication between the supply passage and the control chamber. A supplementary flow path also provides communication between the supply passage and the control chamber under the control of a control valve, so as to allow high pressure fuel to flow from the supply passage into the control chamber through two flow paths when it is required to terminate an injection of fuel.

18 Claims, 4 Drawing Sheets

FUEL INJECTOR

The invention relates to a fuel injector for use in a fuel system of an internal combustion engine. The injector is suitable for use in a common rail fuel system having a common rail pump for supplying fuel to a common rail, which in turn supplies fuel to a plurality of injectors of the fuel system. The injector is also suitable for use in a unit injector fuel system where each injector has a dedicated pump. The invention also relates to a fuel system incorporating the fuel injector.

Known common rail fuel systems include an accumulator volume or common rail which is charged with fuel at high pressure by means of a high pressure fuel pump. Fuel at high pressure is supplied by the common rail to a plurality of injectors, each of which is arranged to inject fuel into an associated engine cylinder.

Each injector includes an injection nozzle having a valve needle which is spring biased towards a closed position in which it is seated against a valve needle seating. Injection is controlled by controlling fuel pressure (control pressure) in a control chamber by means of a two way nozzle control valve. The control chamber is at the back end of the valve needle and communicates continuously with a high pressure supply passage from the common rail.

The nozzle control valve is operable between an open position, in which the control chamber communicates with a low pressure drain, and a closed position in which communication between the control chamber and the drain is broken. In order to commence injection, the control valve is moved into its open position so as to open communication between the control chamber and the low pressure drain, thereby causing fuel pressure within the control chamber to be reduced and thus allowing the valve needle to lift from its seating. In order to terminate injection the control valve is moved into its closed position, closing communication between the control chamber and the low pressure drain. Due to the continuous flow of fuel into the control chamber, high fuel pressure is re-established within the control chamber, which causes the valve needle to be re-seated to terminate injection.

It is one disadvantage of the aforementioned system that when the nozzle control valve is opened to lift the valve needle, there is a continuous flow of high pressure fuel from the high pressure supply passage, through the control chamber to the low pressure drain. The parasitic losses of the system are therefore relatively high. There is also a limit on the maximum closing rate of the valve needle at the end of injection.

It has been recognised that rapid needle closure is beneficial in reducing exhaust emissions, particularly smoke and particulates. However, in systems of the aforementioned type this can only be achieved by means of relatively large flow rates into the control chamber during and at the end of injection, requiring an increased pump capacity, increased system cost and increased fuel consumption.

In contrast to common rail systems, unit injectors are devices in which each injector has a dedicated pumping element for supplying pressurised fuel to the injection nozzle of the same unit, and to no other injectors. It is known to employ three-way control valves in unit injectors and this has been found to reduce parasitic losses and to allow rapid needle closure. However, it is problematic to apply this type of control valve to a common rail fuel system where valve needle opening tends to be very rapid, as this leads to difficulties in controlling small fuel injection quantities (e.g. pilot injections of fuel).

It is one object of the present invention to provide an improved fuel injector, suitable for use in common rail or unit injector type fuel systems, which overcomes or alleviates at least one of the aforementioned problems.

According to a first aspect of the present invention, there is provided a fuel injector for use in a fuel system of an internal combustion engine, the fuel injector comprising a supply passage for high pressure fuel, an injection nozzle including a valve needle which is engageable with a valve needle seating to control high pressure fuel delivery from the injector, a surface associated with the valve needle being exposed to fuel pressure within a control chamber, a first restricted flow path providing communication between the supply passage and the control chamber, a control valve for controlling fuel pressure within the control chamber and a supplementary flow path providing communication between the supply passage and the control chamber under the control of the control valve so as to enable high pressure fuel to flow between the supply passage and the control chamber.

In a preferred embodiment, communication between the supply passage and the control chamber through the first restricted flow path is continuous.

In a further preferred embodiment, the control valve has a control valve member defining first and second seating surfaces for engagement with a respective one of first and second control valve seats.

The control valve has a first operating position in which the supply passage communicates with the control chamber through the supplementary flow path by permitting fuel flow past the first valve seat, and in which first operating position communication between the control chamber and the low pressure drain through the second restricted flow path is prevented.

The control valve preferably has a second operating position in which the control chamber communicates with the low pressure drain through the second restricted flow path, and in which second operating position communication between the supply passage and the control chamber through the supplementary flow path is prevented. It is another advantage of the present invention that parasitic fuel losses are minimised as the control valve takes the form of a three-way control valve.

When it is required to initiate injection, the control valve is moved into the second operating position in which communication between the supply passage and the control chamber through the supplementary flow path is prevented, and the control chamber is brought into communication with the control chamber through the supplementary flow path.

The first flow path is preferably provided with a first restriction to restrict the rate of flow of fuel through the first flow path.

The supplementary flow means preferably includes a second restricted flow path to provide communication either between the supply passage and the control chamber or between the control chamber and the low pressure drain, in dependence upon the position of the control valve. The second restricted flow path is preferably provided with a second restriction to restrict the rate of flow of fuel through the second restricted flow path. The first and second restrictions can be selected so as to provide the required opening and closing characteristics of the valve needle.

Opening movement of the valve needle towards the end of injection can be controlled by careful selection of the restriction in the second flow path to reduce the flow rate between the control chamber and the low pressure drain.

When it is required to terminate injection, the control valve is moved into a first operating position (i.e. a closed position) and high pressure fuel flows through both the first flow path and the supplementary flow path (as opposed to there being only one flow path) to re-establish high fuel pressure within the control chamber. It is therefore one advantage that closing movement of the valve needle can be achieved relatively rapidly due to high pressure fuel flowing into the control chamber through two flow routes.

In one embodiment, the control valve member is provided with a drilling through which fuel flows when the second restricted flow path communicates with the low pressure drain.

At least one of the first and second seating surfaces of the control valve member may be of frusto-conical form. For example, the first seating surface may be of frusto-conical form and the second seating surface may be defined by an end surface of the control valve member.

Preferably, the injector is provided with a means for breaking communication between the control chamber and the low pressure drain through the second restricted flow path when the valve needle has moved away from its seating by a predetermined amount, thereby to limit the loss of pressurised fuel between the control chamber and the low pressure drain during injection.

For example, in a particularly preferred embodiment the valve needle itself is configured so as to break communication between the control chamber and the low pressure drain through the second restricted flow path when it is moved away from its seating by a predetermined amount, for example at maximum lift.

In a preferred embodiment, the second restricted flow path defines an entry port in communication with the control chamber, wherein a further surface associated with the valve needle covers the entry port at maximum needle lift. Typically, for example, the valve needle may include a separate end piece defining the further surface for covering the entry port. This provides the advantage that the loss of pressurised fuel between the control chamber and the low pressure drain during an injection of fuel is limited. A further benefit may also be achieved in that the rate of movement of the valve needle is reduced as it approaches maximum needle lift to cover the entry port.

In an alternative embodiment, the valve needle and the end piece for covering the entry port may be integrally formed together.

The surface associated with the valve needle, which is exposed to fuel pressure within the control chamber, may either be defined by the valve needle itself or, for example, by a piston coupled to the valve needle. If the valve needle is coupled to a piston, the end piece for covering the entry port forms part of the piston.

The fuel injector may include a control valve in the form of an electromagnetically actuable valve or a piezoelectrically actuable valve, and preferably the control valve member is spring-biased closed.

The injector may form part of a common rail fuel system including a common rail pump supplying a common rail (i.e. an accumulator volume for high pressure fuel), in which the common rail supplies fuel to at least one injector of the system. In this implementation, it is one particular advantage of the invention that fuel losses to low pressure during an injection event are limited.

Alternatively, in another aspect of the invention the injector forms a part of a unit injector system in which a dedicated pump supplies pressurised fuel to an associated injector of the same unit, but to no other injectors of the system. The dedicated pump and the injector may form part of an injector/pump unit or, alternatively, the dedicated pump may be spaced remotely from its associated injector by means of a high pressure fuel line. For unit injector applications, it is a particular benefit of the invention that valve needle control is improved, providing advantages when delivering small fuel injection quantities.

The injector is also appropriate for use in fuel systems of the hybrid common-rail/unit injector type, as described in our co-pending European patent application 1359316. In systems of this type each injector has an associated pump, which is able to supply fuel directly to the associated injector or to a common rail supplying fuel to one or more other injectors of the system also.

According to a second aspect of the invention, there is provided a common rail fuel injection system including a plurality of fuel injectors of the type described in the first aspect of the invention and a common source of high pressure fuel for supplying to the plurality of injectors.

According to a third aspect of the invention, there is provided a fuel injection system including a plurality of injectors of the type described in the first aspect of the invention and a dedicated high pressure pump for supplying pressurised fuel to the injector supply passage of an associated one of the injectors.

The invention will now be described, by way of example only, with reference to the accompanying drawings in which.

Figure 1:
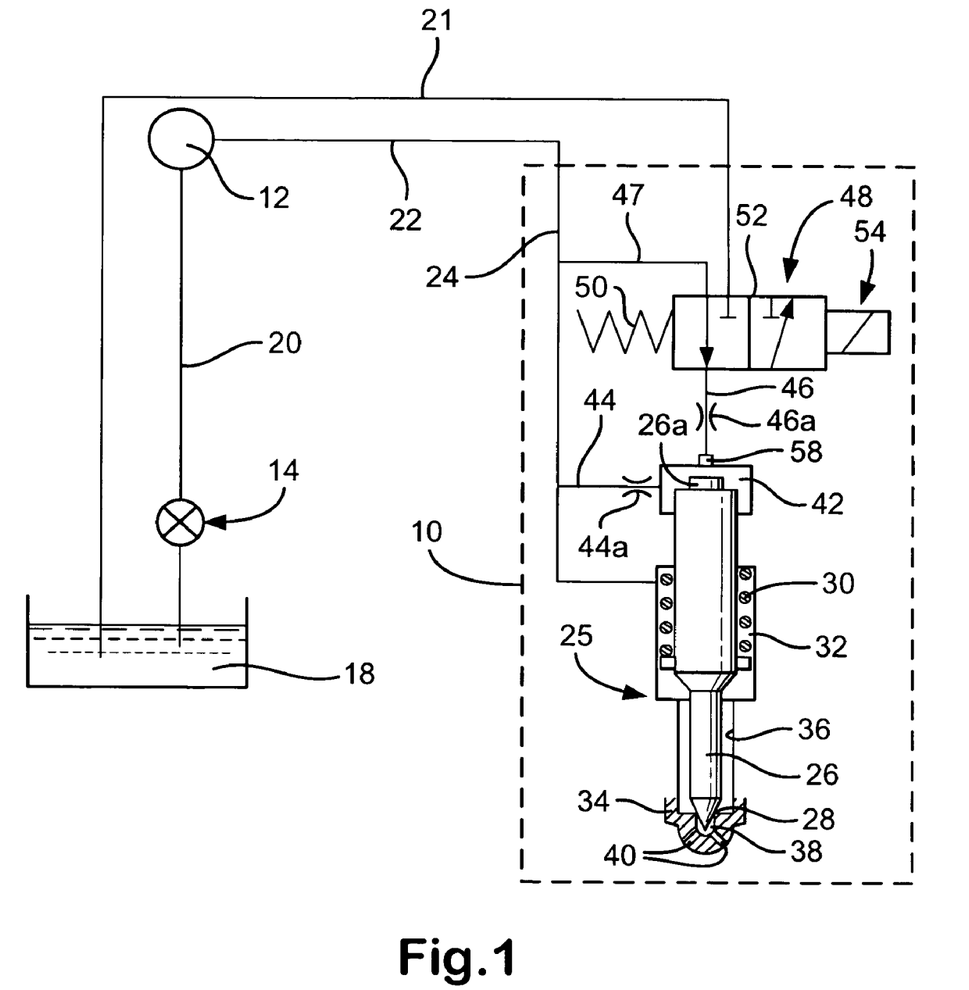
FIG. 1 is a schematic diagram of a first embodiment of the fuel injector when in a first operating condition.

Referring to FIG. 1, a fuel system for a compression ignition internal combustion engine includes a fuel injector (within the dashed line 10) of a first embodiment of the present invention. The injector 10 is arranged to receive high pressure fuel from an accumulator volume or common rail 12, which is charged with fuel at high pressure by means of a high pressure fuel pump 14, typically to a pressure level of around 400–2000 bar. The fuel pump 14 receives fuel at relatively low pressure from a low pressure fuel reservoir or drain 18 and delivers pressurised fuel to the common rail 12 through a first delivery line or flow path 20. The common rail 12 supplies fuel at high pressure (referred to as "supply pressure") through a second delivery line or flow path 22, which in turn is arranged to deliver fuel to a supply passage 24 of the associated injector 10. A return line 21 is provided between the injector 10 and the low pressure drain 18.

In practice, the fuel system includes a plurality of fuel injectors similar to the injector 10, with one injector being provided for each engine cylinder of the associated engine. Each of the injectors of the system is arranged to receive fuel at high pressure from the common rail 12 and operates in the same manner as the other injectors. Therefore, for the purpose of the following description, only one injector 10 of the system will be described.

The injector 10 includes an injection nozzle 25 having a valve needle 26, which is urged towards a valve needle seating 28 by means of a valve needle spring 30 housed within a spring chamber 32. The injection nozzle 25 includes a nozzle body 34 (only a lower end portion of which is indicated) provided with a blind bore 36 within which the valve needle 26 is movable. The spring chamber 32 is defined at the upper end of the nozzle bore 36 and both the chamber 32 and the bore 36 receive high pressure fuel from the injector supply passage 24. The valve needle 26 has upwardly directed thrust surfaces exposed to fuel pressure within the bore 36 and the spring chamber 32, and said fuel pressure causes an upward force to be applied the valve needle 26 which acts in a valve needle opening direction.

The valve needle 26 is movable into and out of engagement with the valve needle seating 28 to control whether fuel delivered to the nozzle bore 36 is able to flow past the valve needle seating 28 and into a sac volume 38 defined at the blind end of the bore 36. The sac volume 38 communicates with a plurality of outlet openings 40 (two of which are shown) provided in the nozzle body 34, so that when the valve needle 26 is moved away from the valve needle seating 28 and fuel flows into the sac volume 38, an injection of fuel occurs through the outlets 40 into the associated combustion space.

At the end of the valve needle 26 remote from the valve needle seating 28, an end surface of the valve needle 26 is exposed to fuel pressure within a control chamber 42. Fuel pressure within the control chamber 42 acts in combination with the valve needle spring force to urge the valve needle 26 against the seating 28.

In another embodiment, the valve needle may be coupled to a needle piston so that it is a surface of the needle piston that is exposed to fuel pressure within the control chamber 42, and not a surface of the valve needle 26 itself.

There are two possible flow paths for fuel into the control chamber 42 from the supply passage 24. A first control chamber filling path in the form of a first flow path 44 is provided between the injector supply passage 24 and the control chamber 42. The first flow path 44 permits a continuous flow of fuel into the control chamber 42 at a restricted rate, as determined by a first restriction or orifice 44a in the path 44. A supplementary control chamber filling path is provided by a supplementary flow path 47 and a second restricted flow path 46. The second flow path 46 has a second restriction or orifice 46a which determines the flow rate through this second flow path 46. The supplementary control chamber filling path 47, 46 is able to supply high pressure fuel to the control chamber 42 under the control of a nozzle control valve 48.

The nozzle control valve takes the form of a three-way control valve 48, which is operable between open and closed positions to determine whether the second restricted flow path 46, and hence the control chamber 42, communicates with the supplementary flow path 47 from the supply passage 24 or with the return line 21. The nozzle control valve 48 includes a nozzle control valve member 52 and a control valve spring 50, which serves to bias the nozzle control valve member 52 into the closed position. When the nozzle control valve is in the closed position, communication between the control chamber 42 and the return line 21, via the second restricted flow path 46, is broken, and instead the control chamber 42 communicates with the supply passage 24 through the supplementary flow path 47 and the second flow path 46. Therefore, in circumstances in which the nozzle control valve 48 is in the closed position, there is a supplementary control chamber filling means (in addition to the first flow path 44) between the injector supply passage 24 and the control chamber 42 by virtue of the supplementary flow path 47 communicating with the second restricted flow path 46.

An electromagnetic actuator, identified generally by 54, is operable to move the nozzle control valve member 52 into the open position, against the control valve spring force. When the nozzle control valve 48 is in the open position, the control chamber 42 communicates with the return line 21 via the second restricted flow path 46, and communication between the control chamber 42 and the supply passage 24 through the additional filling flow path 47, 46 is prevented.

The electromagnetic actuator 54 is of conventional type and includes an energisable winding (not shown in FIGS. 1 and 2) through which a current is supplied when it is required to open the nozzle control valve 48 to commence injection, as discussed further below. The second restricted flow path 46 has an entry port or opening 58 to the control chamber 42. At its upper end, the valve needle 26 is provided with a reduced diameter end piece 26a, which is co-operable with the entry port 58 in circumstances in which the valve needle 26 is moved away from its seating 28 through a predetermined amount, being its maximum extent of travel ("maximum lift"). Co-operation between the end piece 26a of the valve needle and the entry port 58 of the second flow path 46 provides a means of reducing loss of high pressure fuel from the control chamber 42 during an injection event.

Operation of the fuel system so as to provide an injection of the fuel through the outlets 40 will now be described in detail. In the position shown in FIG. 1, the nozzle control valve 48 is in the closed position and there is a supply of high pressure fuel into the control chamber 42 through both the first restricted flow path 44 and the second restricted flow path 46, due to the second restricted flow path 46 communicating with the supplementary flow path 47. In the nozzle control valve closed position, communication between the control chamber 42 and the return line 21, via the second restricted flow path 46, is broken. High fuel pressure within the control chamber 42 acts in combination with the force of the valve needle spring 30 and serves to urge the valve needle 26 into engagement with its seating 28 to prevent injection through the outlet openings 40. This is the non-injecting state of the fuel injector.

When it is required to commence injection, the actuator 54 is energised to move the nozzle control valve 48 into its open position against the force of the control valve spring 50. Opening of the nozzle control valve 48 closes communication between the injector supply passage 24 and the control chamber 42 through the second restricted flow path 46 and opens communication between the control chamber 42 and the return line 21 through the second restricted flow path 46. In such circumstances, fuel within the control chamber 42 is able to flow from the control chamber 42, through the second restricted flow path 46 to the return line 21 and, hence, to low pressure. In this operating condition, the second restricted flow path 46, the lower seat 74 and the return line 21 therefore define a return flow path for fuel between the control chamber 42 and the low pressure drain 18.

Figure 2:
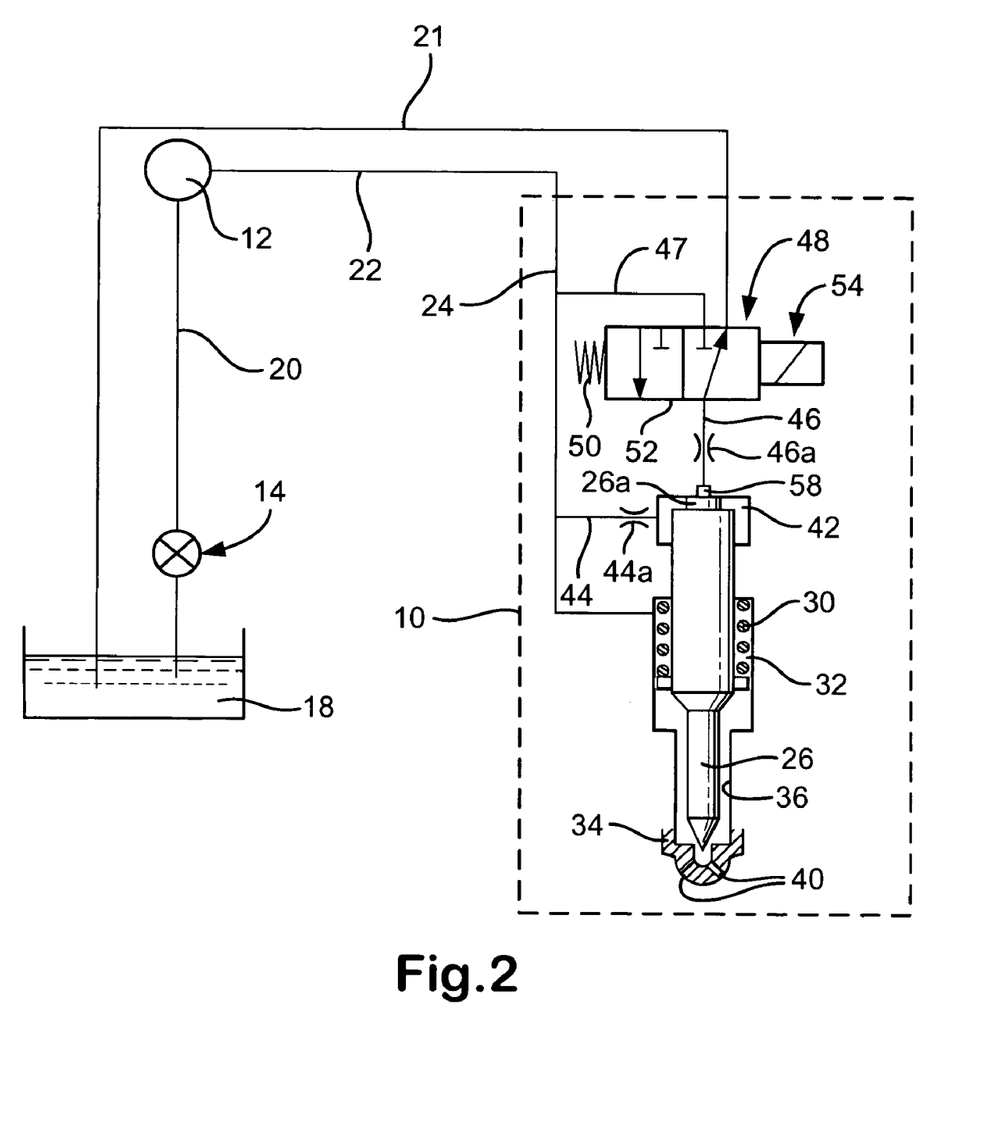
FIG. 2 illustrates the fuel injector in FIG. 1 when in a second operating condition.

As fuel pressure within the control chamber 42 is reduced, the closing force acting on the upper end of the valve needle 26 is reduced. As a consequence, the valve needle 26 is caused to move away from its seating 28 due to high fuel pressure delivered to the nozzle bore 36 acting on the injector thrust surfaces in the valve needle opening direction. Fuel is therefore able to flow into the sac volume 38 and, hence, through the outlet openings 40 into the engine cylinder. This is the injecting state of the fuel system, as shown in FIG. 2.

During the injection phase, fuel pressure within the control chamber 42 will drop to an intermediate level between low pressure (i.e. drain pressure) and supply pressure (i.e. pressure within the supply passage 24). The level to which fuel pressure within the control chamber 42 is reduced is determined by the ratio of the flow areas presented by the first restriction 44a in the first flow path 44 (through which fuel flows into the control chamber 42) and the restriction 46a in the second flow path 46 (through which fuel flows to low pressure). The first and second restrictions 44a, 46a are sized to ensure that, when the nozzle control valve 48 is open, pressure in the control chamber 42 is allowed to reduce at least to a level (the threshold pressure level) which, in combination with the valve needle spring force, is overcome by the upwardly directed forces acting on the valve needle 26. Thus, at some time after the nozzle control valve 48 has moved into its open position, the valve needle 26 will lift away from its seating 28 to allow injection to commence. Once pressure in the control chamber 42 drops to the threshold pressure level, the rate at which fuel pressure within the control chamber 42 is reduced further determines the rate at which the valve needle 26 is caused to lift away from its seating.

The provision of the end piece 26a at the upper end of the valve needle 26 is beneficial as it serves to minimise the flow of pressurised fuel through the nozzle control valve 48 when it is opened to allow injection. When the valve needle 26 is at maximum lift, the end piece of the valve needle 26 covers the entry port 58. Once this has happened, fuel pressure within the control chamber 42 will start to increase due to the continuous flow of fuel into the control chamber 42 through the first flow path 44, 44a. However, as an area of the end piece of the valve needle 26 is exposed to low pressure at the entry port 58, only a reduced surface area of the end of the valve needle 26 is exposed to pressure in the control chamber 42. Thus, as the nozzle bore 36 continues to be supplied with fuel at supply pressure, the valve needle 26 is maintained in its lifted position.

To terminate injection, the nozzle control valve 48 is returned to its closed position by de-energising the actuator winding. Closing the nozzle control valve 48 closes communication between the control chamber 42 and the return line 21 via the second restricted flow path 46 and instead opens communication between the supplementary flow path 47 and the second restricted flow path 46 so that fuel is able to flow into the control chamber 42 through the nozzle control valve 48. High pressure is therefore re-established within the control chamber 42 due to the flow of fuel through the first flow path 44 (which is continuous) and the additional flow of fuel through the second flow path 47, 46. With high fuel pressure re-established in the control chamber 42, the valve needle 26 is essentially pressure balanced and the valve needle spring 30 therefore serves to urge the valve needle 26 against the valve needle seating 28 to terminate injection.

It is one benefit of the fuel injector of the present invention that the flow of fuel into the control chamber 42 at the end of injection is increased due to there being two flow paths between the injector supply passage 24 and the control chamber 42; the first flow path 44 and the additional flow path 47, 46.

The characteristics of the injector 10, for example injection timing (e.g. relative to pumping), rate of movement of the valve needle 26 and fuel delivery quantity can be optimised by careful selection of the flow areas of the restrictions 44a, 46a in the first and second flow paths 44, 46, the pre-load of the valve needle spring 30 and the diameter of the valve needle seating 28.

Figure 3:
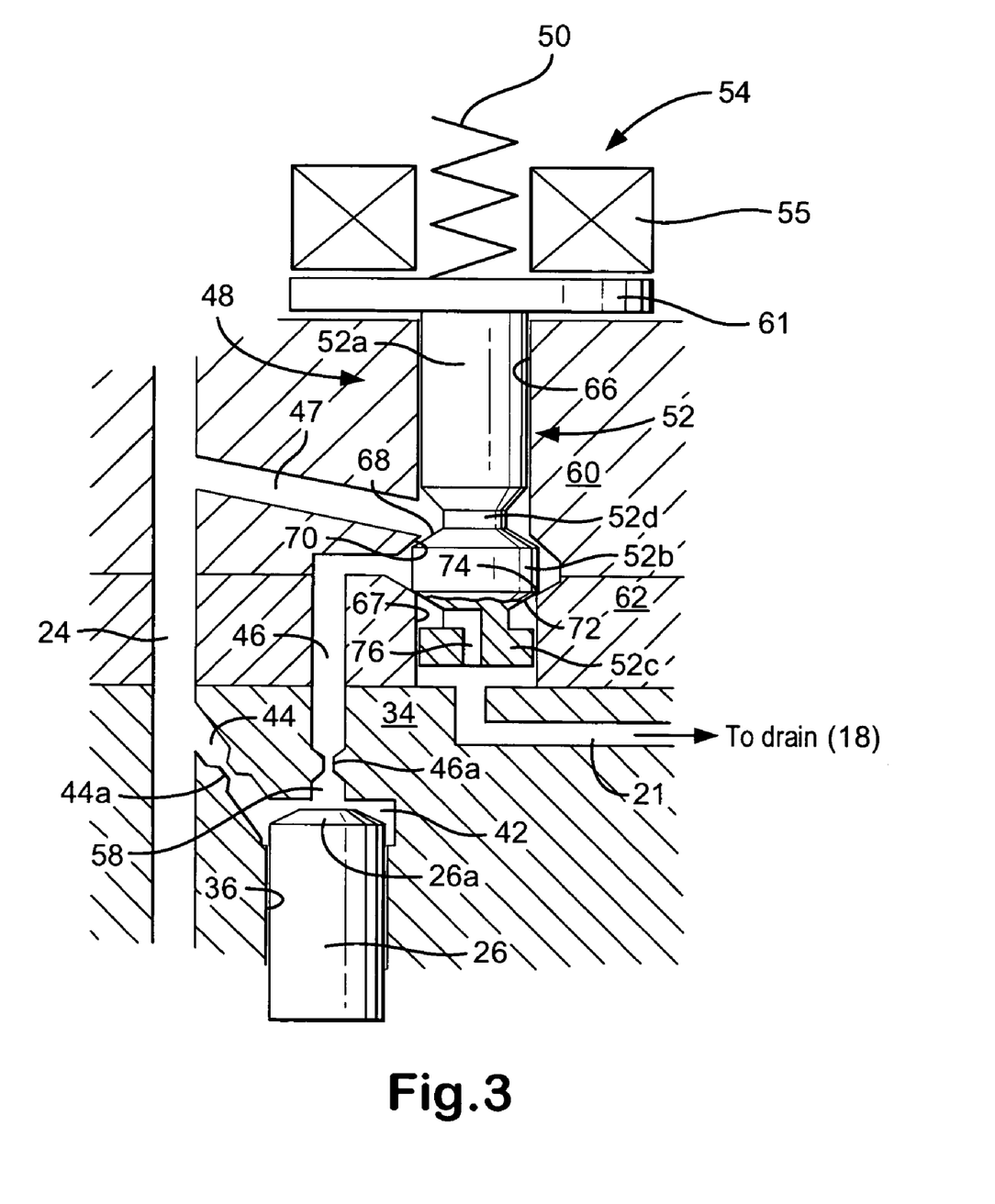
FIG. 3 shows one embodiment of a three-way nozzle control valve forming part of the fuel injector in FIGS. 1 and 2.

The injector 10 is preferably formed such that the injection nozzle 25 and the nozzle control valve 48 form part of the same injector unit 10. By way of example, FIG. 3 shows one practical embodiment of a part of the injector 10 shown in FIGS. 1 and 2. Similar parts to those shown in FIGS. 1 and 2 have been referred to with like reference numerals for ease of reference.

Referring to FIG. 3, the injector 10 includes a valve housing having an upper valve housing part 60 arranged adjacent to a lower valve housing part 62. The lower valve housing part 62 abuts the upper end of the nozzle body 34. The valve housing parts 60, 62 and the nozzle body 34 are provided with drillings, which together define part of the injector supply passage 24. The first restricted flow path 44 is defined by a first drilling provided in the nozzle body 34 so as to communicate with the injector supply passage 24 at one end and the control chamber 42 at its other end. A second drilling is provided in the nozzle body 34 to define, together with drillings in the upper and lower valve housings 60, 62, the second restricted flow path 46, 46a. The nozzle body 34 is also provided, at its upper end, with a third drilling which forms a part of the return line 21 to the low pressure drain 18. A further drilling provided in the upper valve housing 60 defines the supplementary flow path 47, one end of which communicates with the valve housing bore 66 and the other end of which communicates with the supply passage 24.

The actuator 54 includes an electromagnetic winding 55, a spring 50 (as shown in FIGS. 1 and 2) and an armature 61 which is actuable in response to energisation and de-energisation of the winding 55. It should be noted that one difference between the embodiment of FIGS. 1 and 2 and the embodiment in FIG. 3 is that in FIGS. 1 and 2 the actuator 54 is of the 'energise-to-push' type (i.e. energising the winding of the actuator causes the nozzle control valve member to be pushed against the spring force 50), whereas in FIG. 3 the actuator 54 is of the 'energise-to-pull' type.

The nozzle control valve member 52 is coupled to the armature 61. As shown in FIG. 3, the upper valve housing 60 is provided with a first valve housing bore 66 and the lower valve housing 62 is provided with a second valve housing bore 67. The nozzle control valve member 52 includes an upper guide region 52a, being that region coupled to the armature 61, a seating region 52b having upper and lower frusto-conical surfaces and a lower guide region 52c. A valve neck 52d separates the upper guide region 52a from the seating region 52b. The upper guide region 52a is guided for movement within the first valve housing bore 66 and the lower guide region 52c is guided for movement within the second valve housing bore 67. The seating region 52b of the nozzle control valve member 52 includes an upper seating surface 68 which is defined on the upper frusto-conical surface and a lower seating surface 72 which is defined on the lower frusto-conical surface. A region of the valve housing bore 66 is shaped to define an upper valve seat 70 for engagement with the upper seating surface 68 of the nozzle control valve member 52 when in its open position and a lower valve seat 74 for engagement with the lower seating surface 72 of the nozzle control valve member 52 when in its closed position. The upper and lower guide regions 52a, 52c of the nozzle control valve member 52 and the diameters of the first and second valve housing bores 66, 67 are substantially equal so that the nozzle control valve member 52 is pressure balanced.

The lower guide region 52c of the control valve member 52 is provided with a valve drilling 76, which extends through the lower guide region 52c and opens into the second valve housing bore 57 downstream of the lower valve seat 74. The drilling 76 in the valve member 52 provides a communication path between the second restricted flow path 46 and the return line 21 in circumstances in which the nozzle control valve member 52 is in the position in which it seats against the lower valve seat 74.

The nozzle control valve member 52 is biased by means of the spring 50 into the closed position (downwards in the orientation shown) in which its lower seating surface 72 is in engagement with the lower valve seat 74. In such circumstances, fuel is able to flow from the injector supply passage 24, through the supplementary flow path 47, past the exposed upper valve seat 70 and through the second restricted flow path 46 to the control chamber 42. In addition to the flow of fuel through this flow path 47, 46, fuel at supply pressure is also able to flow into the control chamber 42 through the first restricted flow path 44. This is the stage of the injection cycle in which the valve needle 26 is seated and injection does not take place due to high fuel pressure within the control chamber 42.

In order to open the nozzle control valve 48, the actuator winding 55 is energised to cause the seating region 52a of the nozzle control valve member 52 to move away from the lower valve seat 74 into engagement with the upper valve seat 70. In such circumstances, communication between the supplementary flow path 47 and the second restricted flow path 46 is broken and instead communication is established between the control chamber 42 and the return line 21 through the second restricted flow path 46 and the valve drilling 76. Fuel within the control chamber 42 escapes to low pressure through the second restricted flow path 46 at a greater rate than fuel flows into the control chamber 42 through the first restricted flow path 44 and, hence, the valve needle 26 is caused to lift from its seating. During this stage of operation, fuel pressure within the control chamber 42 drops to an intermediate level between supply pressure and drain pressure.

Figure 4:
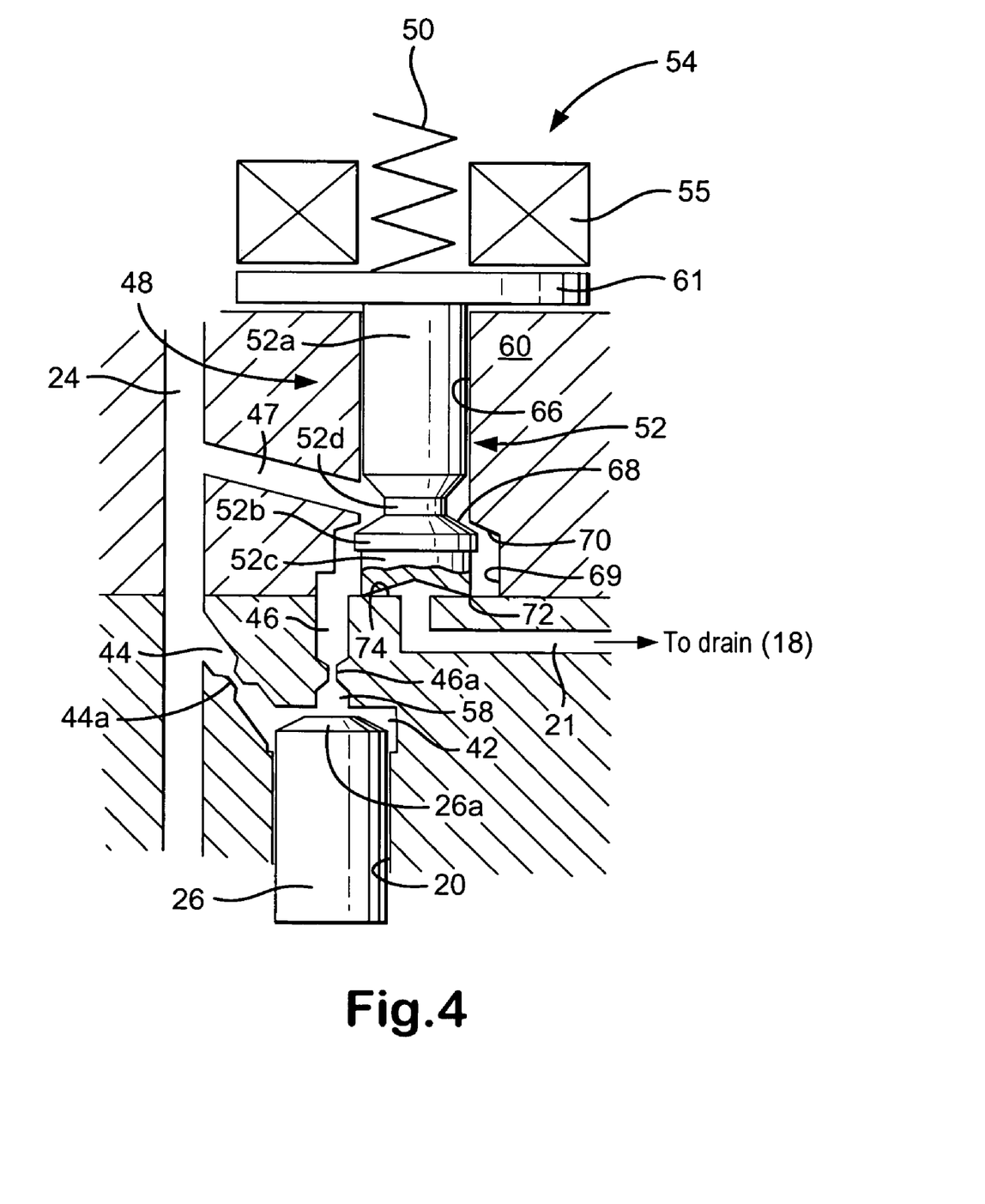
FIG. 4 shows an alternative three-way nozzle control valve for use in the injector shown in FIGS. 1 and 2.

FIG. 4 shows an alternative practical embodiment to that shown in FIG. 3, in which like parts are identified with like reference numerals. As in FIG. 3, the actuator 54 in FIG. 4 is of the 'energise-to-pull' type. One difference between these embodiments, however, is that the lower valve housing 62 in FIG. 3 is not required in FIG. 4. In addition, the nozzle control valve member 52 in FIG. 4 includes only an upper guide region 52a which is guided for movement within an upper valve housing bore 66 in the valve housing 60. The lower region 52c of the nozzle control valve member 52 is not guided, but moves within an enlarged diameter bore region 69 provided in the valve housing 60. The diameters of the upper guide region 52a and the lower region 52c of the valve member 52 are substantially equal. The nozzle control valve member 52 also includes an enlarged diameter collar 52b which is integrally formed with the rest of the valve member 52. A valve neck 52d separates the collar 52b from the upper guide region 52a. The collar 52b includes a frusto-conical surface which defines the upper seating surface 68. The diameter of the upper seating surface 68 against the upper valve seat 70 is substantially equal to the diameters of the upper guide region 52a and the lower region 52c. The lower seating surface 72 is defined by an end surface of the lower valve region 52c so that only the upper seating surface 68 is of frusto-conical form.

The lower seating surface 72 is engageable with a flat, lower valve seat 74 defined by an upper surface of the nozzle body 34.

Operation of the nozzle control valve 48 in FIG. 4 is similar to that described previously for FIGS. 1 to 3. To initiate injection, the nozzle control valve member 52 is moved into its open position by energising the actuator winding 55. When in the open position, the upper seating surface 68 is moved into engagement with the upper valve seat 70 to allow fuel within the control chamber 42 to escape through the second restricted flow passage 46 to the return line 21. To terminate injection, the actuator winding 55 is de-energised and the nozzle control valve member 52 moves under the action of the control valve spring 50 into the closed position in which the lower seating surface 72 engages the lower valve seat 74 to close the second restricted flow path 46 to drain. Instead, fuel is able to flow through the supplementary flow path 47, past the upper valve seat 70 and through the second restricted flow path 46 into the control chamber 42.

Although the diameters of the upper guide region 52a and the lower region 52c of the valve member 52 are substantially equal in FIG. 4, optionally the diameters of the regions 52a, 52c may be adjusted (i.e. so that they are different), either to bias the valve open or to bias the valve closed, in order to optimise the dynamic characteristic.

It will be appreciated that a three-way nozzle control valve of alternative construction may be used to provide the same function as described previously, without departing from the scope of the invention claimed in the accompanying claim set.

As an alternative to providing an electromagnetic actuator to control the nozzle control valve, another type of actuator may be used, for example a piezoelectric actuator.

What is claimed is:

1. A fuel injector for use in a fuel system for an internal combustion engine, the fuel injector comprising:
   a supply passage for high pressure fuel,
   an injection nozzle including a valve needle which is engageable with a valve needle seating to control fuel delivery from the injector, a surface associated with the valve needle being exposed to fuel pressure within a control chamber,
   a first restricted flow path providing communication between the supply passage and the control chamber,
   a control valve for controlling fuel pressure within the control chamber, and
   a supplementary flow path controlling communication between the supply passage and the control chamber under the control of the control valve, so as to allow high pressure fuel to flow between the supply passage and the control chamber,
   wherein the supplementary flow path includes a second restricted flow path and wherein the control valve is operable to control whether fuel flows through the second restricted flow path either (i) between the control chamber and a low pressure drain or (ii) between the supply passage and the control chamber.

2. The fuel injector as claimed in claim 1, wherein communication between the control chamber and the supply passage through the first restricted flow path is continuous.

3. The fuel injector as claimed in claim 1, wherein the control valve has a control valve member defining first and second seating surfaces for engagement with a respective one of first and second valve seats, the control valve having a first operating position in which the supply passage communicates with the control chamber through the supplementary flow path to allow high pressure fuel to flow into the control chamber; and in which first operating position communication between the control chamber and the low pressure drain through the second restricted flow path is prevented.

4. The fuel injector as claimed in claim 3, wherein the control valve has a second operating position in which the control chamber communicates with the low pressure drain through the second restricted flow path, and in which second operating position communication between the supply passage and the control chamber through the supplementary flow path is prevented.

5. The fuel injector as claimed in claim 4, wherein the control valve member is provided with a drilling through which fuel flows when the second restricted flow path communicates with the low pressure drain.

6. The fuel injector as claimed in claim 3, wherein at least one of the first and second seating surfaces is of frusto-conical form.

7. The fuel injector as claimed in claim 6, wherein the first seating surface is of frusto-conical form and wherein the second seating surface is defined by an end surface of the control valve member.

8. The fuel injector as claimed in claim 3, further comprising an arrangement for ensuring communication between the control chamber and the low pressure drain through the second restricted flow path is broken once the valve needle has moved a predetermined distance away from the valve needle seating, thereby to limit the loss of pressurised fuel between the control chamber and the low pressure drain during injection.

9. The fuel injector as claimed in claim 8, wherein the predetermined distance is maximum lift of the valve needle.

10. The fuel injector as claimed in claim 8, wherein the arrangement includes a further surface associated with the valve needle and an entry port of the second resticted flow path which communicates with the control chamber, and wherein the valve needle is movable away from the valve needle seating into a position in which the further surface covers the entry port.

11. The fuel injector as claimed in claim 10, wherein the further surface of the valve needle is defined by an end piece.

12. The fuel injector as claimed in claim 11, wherein the end piece forms an integral part of the valve needle.

13. The fuel injector as claimed in claim 1, wherein the control valve includes an electromagnetic actuator.

14. The fuel injector as claimed in claim 1, wherein the control valve includes a piezoelectric actuator.

15. The fuel injector as claimed in claim 1, wherein the surface associated with the valve needle is either defined by the valve needle itself or by a piston coupled to the valve needle.

16. The fuel injector as claimed in claim 1, wherein the injection nozzle and the control valve are formed within a common injector unit.

17. A common rail fuel injection system including a plurality of fuel injectors as claimed in claim 1 and a common source of high pressure fuel for supplying to the plurality of injectors.

18. A fuel injection system including a plurality of injectors as claimed in claim 1 and a dedicated high pressure pump for supplying pressurised fuel to the injector supply passage of an associated one of the injectors.

* * * * *